W. A. REINHARDT.
PISTON RING.
APPLICATION FILED JAN. 22, 1909.
949,660.
Patented Feb. 15, 1910.
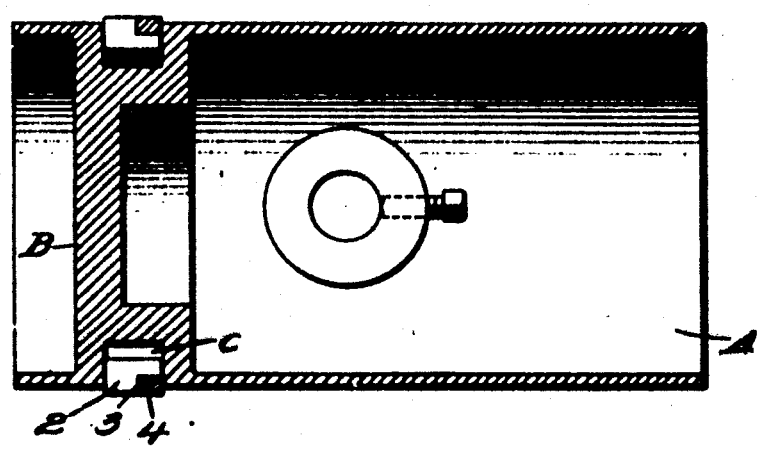
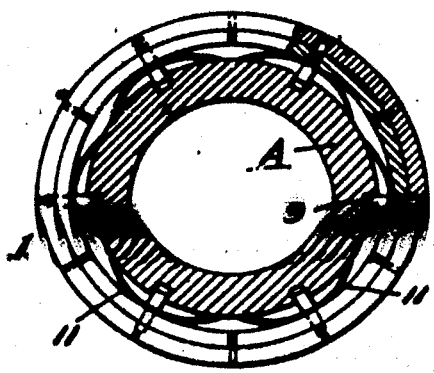
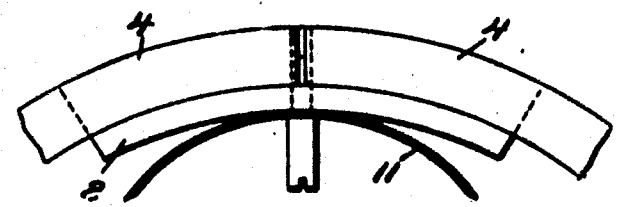
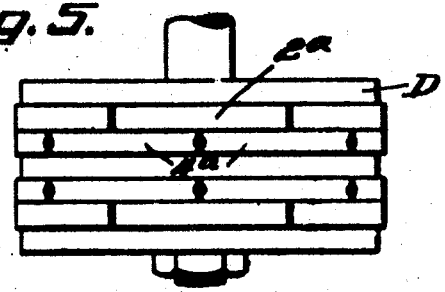
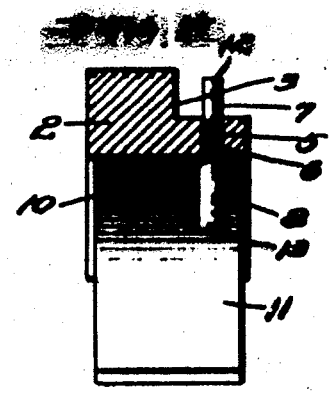
Witnesses
Inventor
William A. Reinhardt
by Victor J. Evans
Attorney

UNITED STATES PATENT OFFICE.

WILLIAM A. REINHARDT, OF ASHLAND, WISCONSIN.

PISTON-RING.

949,660.　　Specification of Letters Patent.　　Patented Feb. 15, 1910.

Application filed January 22, 1909. Serial No. 473,744.

*To all whom it may concern:*

Be it known that I, WILLIAM A. REINHARDT, a citizen of the United States, residing at Ashland, in the county of Ashland and State of Wisconsin, have invented new and useful Improvements in Piston-Rings, of which the following is a specification.

This invention relates to piston rings, and has for an object to provide a ring of this character that will be particularly adapted for use in connection with pistons of gas engines, and providing a segmental ring to be connected with a piston in such manner that it will be yieldingly engaged with the walls of the piston cylinder in order that said ring will accommodate itself to worn cylinders or to those having irregularities.

A still further object of my invention resides in the peculiar arrangement of segments forming the ring, and it is my particular aim to provide a ring, that, when in use will prevent the action of fluid pressure against the ring which would otherwise tend to prevent the proper action of the springs employed by me.

Another object of my invention is to provide novel and effective means for retaining the springs to certain of the segments forming the rings, and to construct said means so that they also serve to prevent lateral movement of said segments when a piston is moving in its cylinder.

Other objects and advantages will be apparent as the nature of the invention is better set forth, and it will be understood that changes within the scope of the claim may be resorted to without departing from the spirit of the invention.

In the drawing, forming a portion of this specification and in which like characters of reference indicate similar parts in the several views:—Figure 1 is a longitudinal section through a piston showing the application of my improved ring thereto. Fig. 2 is a vertical transverse section through the piston and ring. Fig. 3 is a detail elevation of a portion of the ring. Fig. 4 is a detail section of one of the ring segments showing the manner of securing the springs. Fig. 5 is a detail side view of a portion of a piston for use in connection with cylinders of steam engines.

Referring now more particularly to the drawing, there is shown a piston A of usual construction provided with a diaphragm or head B in which is formed an annular groove or recess C that opens onto the peripheral surface of said piston.

My improved piston ring is indicated at 1 and comprises a plurality of arcuate segments 2 having rabbeted portions 3 that receive arcuate segments 4, as shown. As clearly shown in Figs. 2 and 3 of the drawing, the segments 2 when arranged in their operative positions are disposed with their ends in spaced relation with respect to each other, and the joints between said segments are closed by the segments 4. The segments 2 have formed therein a plurality of radially extending threaded passages 5 that receive threaded portions 6 of studs 7. The studs 7 are provided with inwardly extending enlarged cylindrical portions 8 seated in correspondingly shaped lateral recesses 9 formed in the piston A. By providing the enlarged cylindrical portions 8, it will be seen that shoulders 10 are provided adjacent to the threaded portions 6 of the studs 7 so that arcuate springs 11 when positioned upon said studs 7 can be effectively engaged by the portions 8 of the studs 7 and confined between the inner walls of the segments 2 and the shoulders 10.

In order to prevent lateral movement of the segments 4 when the piston A is moving, I provide the said segments 4 at the ends thereof with segmental grooves 12 adapted to aline with each other to receive the outer ends of the studs 7 that extend into the rabbeted portions 3 of the segments 2. In order that the studs 7 can be conveniently applied to the segments 2 I form at one end of each portion 8 of the said studs a kerf 13 to receive a screw-driver or like tool.

From the construction herein set forth and described it will be seen that I provide an extremely simple and inexpensive ring that can be applied in a simple and convenient manner to the piston, and by providing the piston A with the annular groove or recess C to receive the ring it is obvious that gas or fluid pressure in its attempt to pass the segments forming the ring would be obviated, thus allowing the springs 11 to respond at all times in order that the segments forming the ring can be expanded or moved radially to provide a close fit in a worn piston cylinder or in one having certain irregularities which, with the well known form of piston ring would prevent a perfect operation of the engine.

The construction of the groove C formed in the piston A is such that the segments of the ring 1 are guided in their radial movement between the walls of said groove. As hereinbefore stated the ring shown in Figs. 1 to 4 of the drawing is preferably adapted for use in connection with pistons of gas engines, but in order that it will be readily appreciated that I do not rely particularly upon the use of my ring in connection with such engines I have shown in Fig. 5 of the drawing a piston D of the type generally used in cylinders of steam engines. In this form of my invention I use identically the same rings as hereinbefore described but provide the said piston D with two or more rings in order to provide a more effective construction for pistons of this type. It will be seen that segments 2ª are arranged with respect to the segments 4ª so that the joints of the last named segments assume a position between the ends of the segments 2ª. It is thought that the construction of this form of my invention will be readily apparent in view of the fact that it is merely a repetition of the preferred form with the exception of the fact that I employ a plurality of rings arranged upon the piston to more effectively prevent the passage of steam between the cylinder and the said piston.

I claim:—

A device of the class described, a piston having an annular groove formed therein, a ring located in said groove and comprising a plurality of arcuate sections, said sections having rabbeted portions formed therein, a plurality of sections seated in the rabbeted portions of the first named sections and adapted to span the joints between the first named sections, springs located in the groove formed in said piston and adapted to yieldingly support said sections, said first named sections having alining passages formed therein at their ends, and radial spring-engaged studs having their inner extremities engaged with the piston and having their extreme outer ends mounted in the alining recesses formed in the second named sections, said first named sections having threaded apertures disposed in line with the recesses formed in the end portions of the second named sections, said studs having threaded portions engaged in the said threaded passages.

In testimony whereof I affix my signature in presence of two witnesses.

WILLIAM A. REINHARDT.

Witnesses:
EDWARD L. PIEPER,
JOSEPH STADLER.